United States Patent
Carruth et al.

[19]

[11] Patent Number: 6,044,585
[45] Date of Patent: Apr. 4, 2000

[54] PLANT CONTAINER

[76] Inventors: Kerry Lee Carruth; Barbara Carol Carruth, both of 7153 Helmsdale Cir., West Hills, Calif. 91307

[21] Appl. No.: 09/338,460

[22] Filed: Jun. 22, 1999

[51] Int. Cl.[7] .................................................. A01G 9/02
[52] U.S. Cl. ................................................ 47/65.5
[58] Field of Search ..................... 47/65.5, 66.1, 47/83, 85, 68, 69

[56] References Cited

U.S. PATENT DOCUMENTS

| | | | |
|---|---|---|---|
| 289,102 | 11/1883 | Holden | 47/65.5 X |
| D. 393,816 | 4/1998 | Conner | 47/66.1 X |
| D. 416,214 | 11/1999 | Conner | D11/143 |
| 1,500,917 | 7/1924 | Bell | 47/66.1 X |
| 3,747,268 | 7/1973 | Linder | 47/69 |
| 4,510,712 | 4/1985 | Whitcomb | 47/65.5 |
| 4,612,726 | 9/1986 | Mori | 47/85 |
| 5,412,907 | 5/1995 | Anderson | 47/85 |

FOREIGN PATENT DOCUMENTS

| | | | |
|---|---|---|---|
| 0 142 471 | 5/1985 | European Pat. Off. | 47/66.1 |
| 2 479 650 | 10/1981 | France | 47/83 |

*Primary Examiner*—Michael J. Carone
*Assistant Examiner*—Jeffrey L. Gellner
*Attorney, Agent, or Firm*—Robert D. Fish; Fish & Associates, LLP

[57] ABSTRACT

An independently operable plant container is provided having a plurality of side walls wherein a horizontal cross section of two of the side walls form at least one apparent angle substantially greater or equal than 90°, and wherein another horizontal cross section of two of the side walls form at least one apparent angle of substantially less than 90°. The plant container further comprises a channel in one of the side walls, wherein the channel is tapered such that two of the plant containers, each having a height x, can be stacked to a total height of no more than 1.75x.

16 Claims, 2 Drawing Sheets

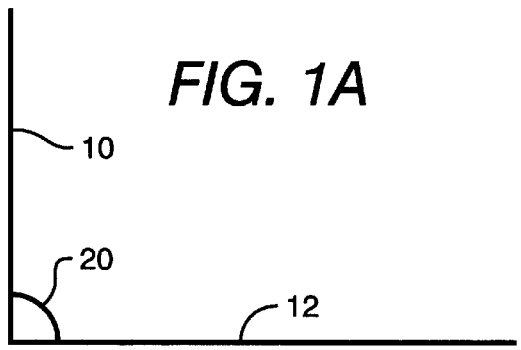
FIG. 1A
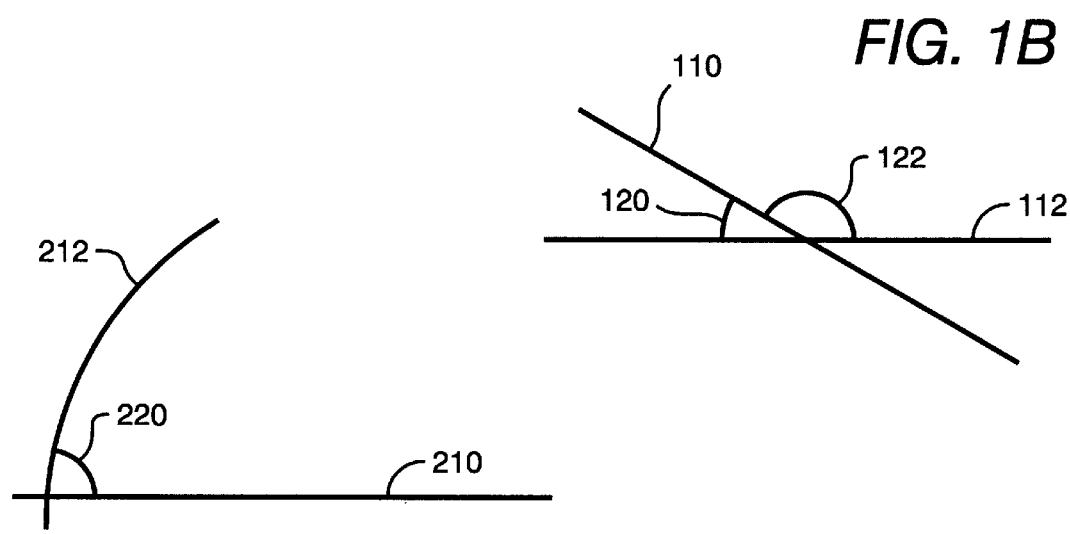
FIG. 1B
FIG. 1C
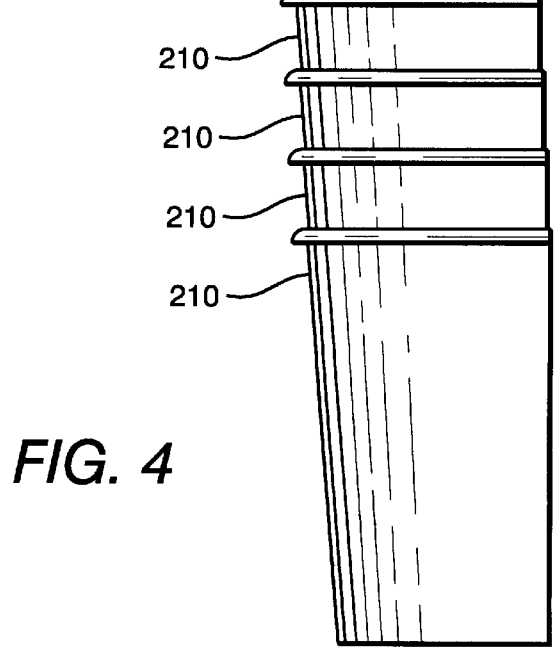
FIG. 4

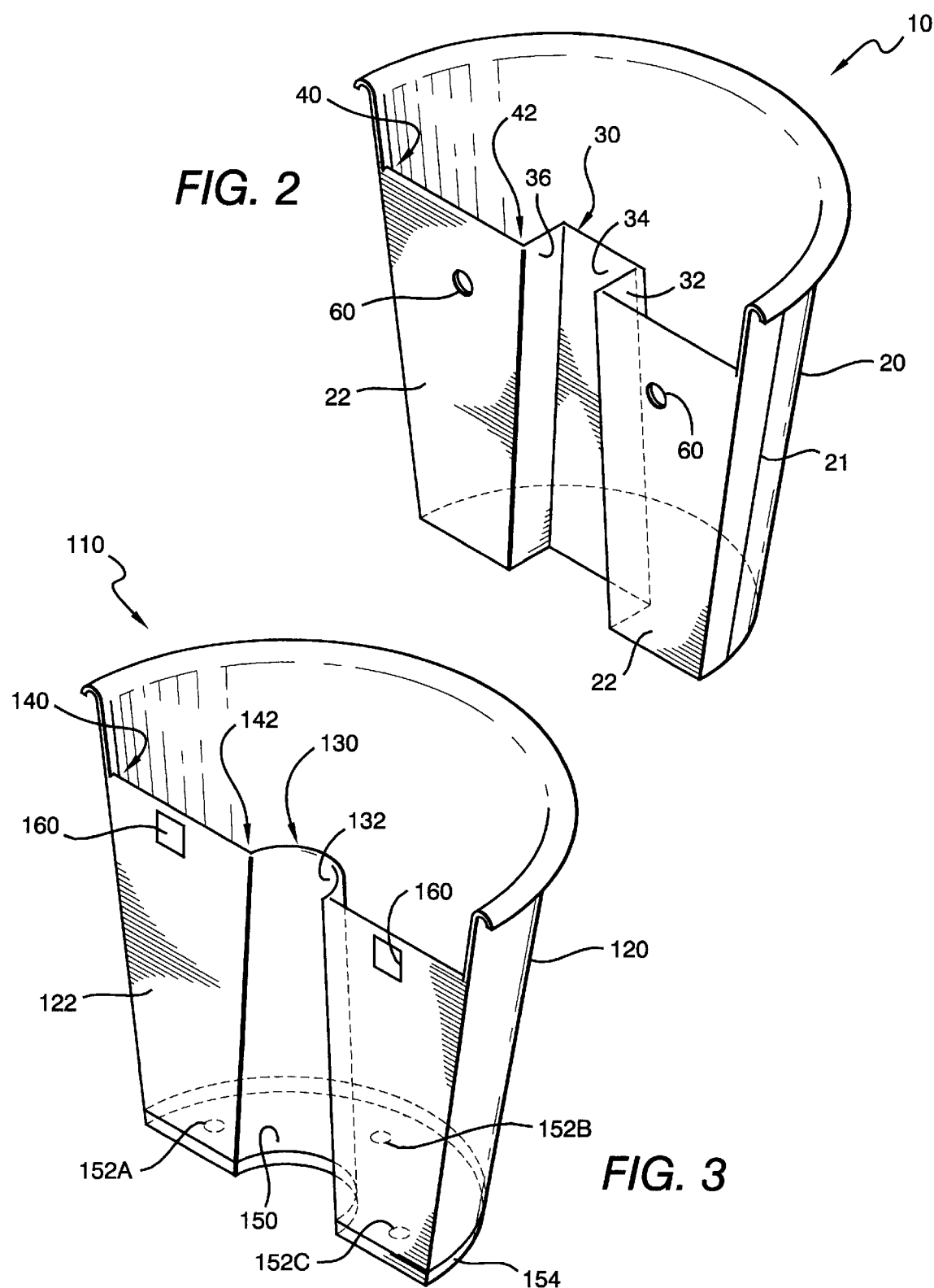

PLANT CONTAINER

FIELD OF THE INVENTION

The field of the invention is horticulture, especially relating to plant containers.

BACKGROUND OF THE INVENTION

Plant containers for cultivation of flowers, ornamental plants, and vegetables are well known in the art. In general, a plant container has a bottom part, side walls, and has typically a round, or square shape. In many instances plant containers may have additional features that help satisfy particular demands of various gardening applications.

Some plant containers vary considerably with respect to their material. For example, many plant containers are made from polyethylene to be cost-effective and robust at relatively low weight. Other more decorative containers are made from clay or hand-painted ceramics to esthetically enhance indoor or outdoor residential areas. Landscaping frequently utilizes immobile containers with relatively large volume, which are typically made from concrete or cement.

Other plant containers vary considerably with respect to their function. For example, some containers that are especially useful for growing plants with invasive roots have side walls attached to the bottom at a relatively shallow angle. Other containers are collapsible and can be stored away when not in use, as described by Weiman in U.S. Pat. No. 3,006,496 and Liard in U.S. Pat. No. 4,325,202. In further examples, U.S. Pat. No. 2,594,307 to Valenzuela, and U.S. Pat. No. 3,195,272 to Mosher et al., containers are shown that can be disassembled to facilitate separation of soil and root ball from the container. Yet other containers, as described in U.S. Pat. No. 3,990,179 to Johnson et al., show a multi sectioned plant container that can be reduced or enlarged in size by removing or adding ring-shaped elements to a container, and in U.S. Pat. No. 3,991,516 to Cicero, a container is shown, which is tapered inwardly from the bottom to the top to allow enhanced root growth.

Still other plant containers comprise multiple containers arranged in form of a tray for simultaneously growing a plurality of relatively small plants, including seedlings, kitchen herbs, etc. as shown in U.S. Pat. No. D0277467 to Tauno, e.g.

Surprisingly, in spite of a large variety of plant containers especially adapted to various particular functions, almost all known containers invariably have the same basic round or rectangular shape. Therefore, there is still a need to provide improved plant containers.

SUMMARY OF THE INVENTION

An independently operable plant container is provided having a plurality of side walls defining a cavity wherein a horizontal cross section of two of the side walls form an inside angle greater than or equal to 90°, and wherein a horizontal cross section of two of the side walls form an inside angle of less than 90°. The independently operable plant container also comprises a channel that is tapered such that two of the plant containers, each having a height x, can be stacked to a total height of no more than 1.75x. The channel is preferably tapered upwardly so that lower portions of the channel are wider than upper portions of the channel.

In one preferred aspect of the inventive subject matter, at least one side wall of the plant container is curved, and in a more preferred aspect, at least one of the side walls includes the channel. In a still more preferred aspect, the channel comprises at least three additional side walls.

In another preferred aspect of the inventive subject matter, the plant container comprises a base. In a more preferred aspect the base is detachable, and in an even more preferred aspect, the detachable base comprises drainage holes. In a further preferred aspect, the plant container comprises a coupling port.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIGS. 1A–C are schematics of angles formed by the intersection of lines.

FIG. 2 is a perspective view of a first embodiment according to the inventive subject matter.

FIG. 3 is a perspective view of a second embodiment according to the inventive subject matter.

FIG. 4 is a side view of four stacked plant containers according to the inventive subject matter.

DETAILED DESCRIPTION

As used herein, the term "plant container" refers to a container suitable for growing flowers, vegetables and ornamental plants. The plant container harbors at least part of a plant, for example, roots, or a stem.

As also used herein, the term "independently operable" means that a single plant container can be operated properly in a 'stand-alone' manner when disposed on the ground. Under the scope of this definition, an independently operable plant container is circumferentially delimited to hold soil within the container while standing on the ground. Consequently, a U-shaped container is not independently operable, since soil cannot be held within a U-shaped container due to a missing confining wall. Also, under this definition, an independently operable plant container does not require a bottom, because the ground may act as the bottom.

As further used herein the term "side wall" refers to a wall that alone, or in combination with at least one other wall, defines a cavity. Contemplated side walls may be vertical, tilted, or curved.

As used herein, the term "channel" refers to an indentation that may traverse the entire height of a side wall.

As still further used herein, the term "angle" refers to a junction of two lines, which connect or intersect at one point. A pair of angles is always formed between two intersecting or connecting lines wherein one of the angles is greater or equal than 90°, and one of the angles is less or equal than 90°. Where a horizontal cross section of two side walls of a plant container forms a pair of angles, one angle will lie within the cavity defined by the side walls, while the other angle lies on the outside of the cavity. Under the scope of this definition, angles formed by side walls that lie within the cavity are referred to as "internal angles". In most cases, the lines that form an angle are straight lines, and in such cases the term "angle" and "apparent angle" as used interchangeably. In cases where one line is a straight line and the second line is an arc, the actual angle is actually formed between the first line and the tangent of the arc, but the visually apparent angle is different from the actual angle. As used herein, the apparent angle formed between a straight line and an arc is defined to be some angle other than 90°. This is further illustrated in FIG. 1A, where two lines 10 and 12 connect perpendicularly to form 90° angle 20. In FIG. 1B, two lines 110 and 112 intersect to form 30° angle 120 and 150° angle 122. In FIG. 1C, line 210 intersects with arc 212 to form apparent angle 220 approximating, but less than 90°.

Referring to FIG. 2, a plant container 10 is shown having curved side wall with cosmetic ribs 21 and a straight side wall 22. Straight side wall 22 has tapered channel 30 with additional side walls 32, 34, and 36. At substantially any given horizontal cross section, curved side wall 20 and straight side wall 22 form apparent internal angle 40, and straight side wall 22 and additional side wall 36 form apparent internal angle 42. Straight side wall 22 further has two coupling ports 60.

In a preferred embodiment, plant container 10 has a size of approximately 17"–18" height and a radius of about 10". Plant container 10 is made from ⅛" thick, maroon-colored, injection molded polyvinyl chloride. Curved side wall 20 having horizontal cross section approximating a half-circle. Side wall 22 has additional side walls 32, 34, and 36, forming channel 30. Channel 30 furthermore has a 5° inward taper from the bottom to the top. Apparent internal angle 40 is about 85°, and apparent internal angle 42 is 90°, and coupling ports 60 are holes.

In alternative embodiments, many sizes other than approximately 17"–18" height and a radius of about 10" are contemplated, including larger sizes of about between 19" to 40" and more, but also smaller sizes of about between 16" and 3" and less. Similarly, the radius of alternative plant containers may vary considerably between about 9" to 2" and less, or between about 11" to 20" and more. With respect to the thickness of the side walls it is contemplated that many strengths other than 1 mm are also appropriate, typically depending on the material of the plant container or the desired ruggedness. Appropriate thickness may therefore vary between less than ¹⁄₁₆" and more than ½".

It is further contemplated that alternative plant containers need not be injection molded, but may be fabricated using other manufacturing processes, including automatic and manual processes. For example, automatic processes may involve welding, press-forming, and casting. Manual processes may include hand-assembly of prefabricated curved walls and side walls, but also manual forming of alternative containers from clay, etc. It should also be appreciated that appropriate materials for alternative plant containers are not limited to polyvinyl chloride, but may include many different material including natural and synthetic polymers, metals, clay, and any reasonable combination thereof. For example, contemplated materials include high density polyethylene, recycled plastics, cork, and aluminum.

In other alternative embodiments, side wall 20 may define horizontal cross sectional shapes other than a half-circle, including round, angular, and irregular shapes. For example, round shapes include wave-shapes, ellipsoid shapes, and spherical shapes (i.e., when the vertical cross section is also a circle). Angular shapes include triangular, polygonal and meandering shapes. Similarly, side wall 20 may also vary considerable in its shape and may be straight, angular-shaped or curved.

In still further alternative embodiments, appropriate additional side walls may vary in number and shape, so long as they form a tapered channel. With respect to the taper, the taper need not be limited to 5°, but may instead vary from less than 4° to about 30° or more.

In still further alternative embodiments, apparent internal angle 40 and apparent internal angle 42 are not restricted to 85° and 95°, respectively. Both angles may differ greatly, and may include smaller angles of about 84° to 15° or less, but may also include larger angles of 91° to 165°.

Referring to FIG. 3, plant container 110 has a curved side wall 120 and a straight side wall 122, with additional side wall 132 forming channel 130. Straight side wall 122 further contains coupling port 160 on each side of channel 130. Channel 130 is tapered inwardly from bottom to top. Bottom 150 is coupled to side walls 120 and 122 through lip 154, and bottom 150 has drainage holes 152A–152C. Curved side wall 120 and straight side wall 122 form apparent internal angle 140, and straight side wall 122 and additional side wall 132 form internal angle 142.

In a preferred embodiment, plant container 110 has a size of approximately 17"–18" height and a radius of about 10". Plant container 110 is again advantageously made from ¹⁄₁₆" thick, maroon-colored injection molded polyvinyl chloride, and curved side wall 120 has a horizontal cross sectional shape of a half-circle. Straight side wall 122 has an additional, round side wall 132 forming channel 130. Channel 130 is tapered at a 10° angle from bottom to top. Apparent internal angle 140 is about 85°, and internal angle 142 is about 95°. Bottom 150 is glued to side walls 120 and 122 through lip 154, and bottom 150 further has drainage holes 152A–152C. Coupling port 160 is a recess of approximately 1"×1" and extends on both sides of straight wall 122.

With respect to corresponding elements in FIGS. 1 and 2, wherein like numerals depict like components, the same considerations apply as described above. In further alternative embodiments, bottom 150 need not be glued to side walls 120 and 122, but may also be affixed in various manners other than gluing. For example, bottom 150 may be molded or slip-fit to side walls 120 and 122, but bottom 150 may also be integrally fabricated with the side walls in a single step process such as injection molding. It should further be appreciated that the size and number of drainage holes may vary considerably. For example, alternative bottom 150 may have 1 or 2 drainage holes, but also 4–20 drainage holes and more are contemplated.

In further alternative embodiments, coupling port 160 is not restricted to a single recess on straight wall 122, but may various forms and shapes other than a 1"×1" recess. Alternative coupling ports with larger or smaller recesses are contemplated so long as two coupling ports can be connected to each other with a clip connector (not shown). It is still further contemplated that appropriate coupling ports may have various forms and shapes other than a recess, including holes that accommodate dowels or screws, hook-and-loop type connectors, etc.

Referring to FIG. 4, a stack of four plant containers 210 is shown. Of course, FIG. 4 shows stacking only by way of example, and it is contemplated that many more, but also less than 4 plant containers may be stacked together.

Thus, specific embodiments of improved plant containers have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An independently operable plant container comprising:
   a plurality of side walls defining a cavity wherein a horizontal cross section of two of the side walls form at least one apparent inside angle greater than or equal than 90°, and wherein a horizontal cross section of two of the side walls form at least one apparent inside angle of less than 90°; and
   at least one continuous channel in at least one of the side walls, wherein the continuous channel is tapered, such that two of the plant containers, each having a height x, can be stacked to a total height of 1.75x.

2. The plant container of claim 1 wherein the channel comprises a curved wall.

3. The plant container of claim 2 wherein the channel comprises three side walls.

4. The plant container of claim 1 wherein at least one of the side walls is curved.

5. The plant container of claim 4 wherein the at least one curved side wall has a hemispherical horizontal cross section.

6. The plant container of claim 1 wherein at least one side wall has a smooth outer surface.

7. The plant container of claim 1 wherein at least one side wall has cosmetic ribs on the outer surface.

8. The plant container of claim 1 further comprising a bottom.

9. The plant container of claim 7 wherein the bottom is detachable.

10. The plant container of claim 7 wherein the bottom comprises a drainage hole.

11. The plant container of claim 1 further comprising a coupling port.

12. The plant container of claim 10 wherein the coupling port comprises a recess.

13. The plant container of claim 10 wherein the coupling port comprises a hole in a side wall.

14. The plant container of claim 1 wherein the channel is tapered inwardly from the bottom to the top.

15. The plant container of claim 1 wherein two of the plant containers, each having a height x, can be stacked to a total height of 1.5x.

16. The plant container of claim 1 wherein two of the plant containers, each having a height x, can be stacked to a total height of 1.3x.

* * * * *